US012504421B2

(12) United States Patent
Xia et al.

(10) Patent No.: US 12,504,421 B2
(45) Date of Patent: Dec. 23, 2025

(54) APPARATUS AND DEVICE FOR SENSING ANALYTE CONTAINED IN LIQUID

(71) Applicant: Qitan Technology Ltd., Chengdu, Sichuan (CN)

(72) Inventors: Xiaoxiang Xia, Sichuan (CN); Qiang E, Sichuan (CN)

(73) Assignee: Qitan Technology Ltd., Chengdu (CN)

( * ) Notice: Subject to any disclaimer, the term of this patent is extended or adjusted under 35 U.S.C. 154(b) by 248 days.

(21) Appl. No.: 18/219,574

(22) Filed: Jul. 7, 2023

(65) Prior Publication Data

US 2023/0349884 A1 Nov. 2, 2023

Related U.S. Application Data

(63) Continuation of application No. PCT/CN2022/109447, filed on Aug. 1, 2022.

(30) Foreign Application Priority Data

Sep. 22, 2021 (CN) .......................... 202111104038.X

(51) Int. Cl.
*G01N 33/487* (2006.01)
*B82Y 15/00* (2011.01)

(52) U.S. Cl.
CPC ........ *G01N 33/48721* (2013.01); *B82Y 15/00* (2013.01)

(58) Field of Classification Search
None
See application file for complete search history.

(56) References Cited

U.S. PATENT DOCUMENTS

2014/0152330 A1* 6/2014 Afzali-Ardakani .... B82Y 15/00
324/693
2015/0160157 A1 6/2015 Peng
(Continued)

FOREIGN PATENT DOCUMENTS

CN 103380369 A 10/2013
CN 104903715 A 9/2015
(Continued)

OTHER PUBLICATIONS

The First Office Action dated Nov. 4, 2021 issued for Chinese Patent Application No. 202111104038.X.
(Continued)

*Primary Examiner* — J. Christopher Ball
(74) *Attorney, Agent, or Firm* — K&L Gates LLP

(57) ABSTRACT

The present application discloses an apparatus and a device for sensing an analyte contained in liquid. The apparatus provided by the present application includes a liquid flow structure component and a sensing component. The liquid flow structure component includes: a measurement chamber configured to receive the analyte to be sensed, and wherein a sensible electrical signal is generated when the analyte to be sensed enters the measurement chamber along a first direction; an outlet chamber in fluid connection with the measurement chamber; and a nanochannel including a first opening connecting with the measurement chamber and a second opening connecting with the outlet chamber, wherein a height difference between the first opening and the second opening of the nanochannel in the first direction is less than 20 μm. The sensing component is coupled to the measurement chamber to sense the electrical signal.

19 Claims, 6 Drawing Sheets

(56) References Cited

U.S. PATENT DOCUMENTS

| | | |
|---|---|---|
| 2018/0238824 A1 | 8/2018 | Lee et al. |
| 2019/0120816 A1 | 4/2019 | Liu et al. |
| 2019/0137431 A1 | 5/2019 | Yanagawa et al. |
| 2020/0033321 A1 | 1/2020 | Liu et al. |
| 2020/0292521 A1 | 9/2020 | Xie et al. |
| 2021/0156819 A1 | 5/2021 | Boyanov et al. |

FOREIGN PATENT DOCUMENTS

| | | |
|---|---|---|
| CN | 106970130 A | 7/2017 |
| CN | 107683337 A | 2/2018 |
| CN | 207318400 U | 5/2018 |
| CN | 207318408 U | 5/2018 |
| CN | 109196343 A | 1/2019 |
| CN | 109890497 A | 6/2019 |
| CN | 111085280 A | 5/2020 |
| CN | 111094976 A | 5/2020 |
| CN | 111194408 A | 5/2020 |
| CN | 112292462 A | 1/2021 |
| CN | 112708544 A | 4/2021 |
| CN | 112795476 A | 5/2021 |
| CN | 112816679 A | 5/2021 |
| CN | 112859992 A | 5/2021 |
| CN | 113552332 A | 10/2021 |
| EP | 2430146 B1 | 9/2015 |
| WO | WO2017165267 A1 | 9/2017 |
| WO | WO2017208631 A1 | 12/2017 |
| WO | WO2019001952 A1 | 1/2019 |
| WO | WO2019160925 A1 | 8/2019 |

OTHER PUBLICATIONS

The Second Office Action dated Nov. 25, 2021 issued for Chinese Patent Application No. 202111104038.X.
The Third Office Action dated Jan. 7, 2022 issued for Chinese Patent Application No. 202111104038.X.
The Notification of Grant dated Mar. 30, 2022 issued for Chinese Patent Application No. 202111104038.X.
International Search Report dated Oct. 27, 2022 issued for International PCT Application No. PCT/CN2022/109447.
Gao, et al., "A 30 nm Nanopore Electrode: Facile Fabrication and Direct Insights into the Intrinsic Feature of Single Nanoparticle Collisions", Angew. Chem. Int. Ed. 2017, 56, 1-6, Wiley Online Library.
Yan et al., "Design of a Novel Sensing Probe for Nanopore Single-Molecule Detection", Journal of East China University of Science and Technology (Natural Science Edition), vol. 44, No. 6, Dec. 2018, 869-875.
EPO; Extended European Search Report for European Patent Application No. 22871625.4 dated Jan. 2, 2025, 9 pages.

* cited by examiner

APPARATUS AND DEVICE FOR SENSING ANALYTE CONTAINED IN LIQUID

CROSS-REFERENCE TO RELATED APPLICATION

The present application is a continuation of International Application No. PCT/CN2022/109447 filed on Aug. 1, 2022, which claims priority to Chinese Patent Application No. 202111104038.X, filed on Sep. 22, 2021 and entitled "APPARATUS AND DEVICE FOR SENSING ANALYTE CONTAINED IN LIQUID", both of which are hereby incorporated by reference in their entireties.

TECHNICAL FIELD

The present application relates to a technical field of biological detection, and particularly relates to an apparatus and a device for sensing an analyte contained in liquid.

BACKGROUND

In nanopore sequencing, by applying an electric potential, biopolymers are driven through a nanopore sequencing channel on a molecular membrane, and the biopolymers passing through the nanopore sequencing channel are identified by utilizing current changes cause by different molecules passing through the nanopore sequencing channel. These current changes are very small, usually in the order of tens of picoampere, and are difficult to detect. Therefore, the accuracy of measurement results is not high.

SUMMARY

Embodiments of the present application provide an apparatus and a device for sensing an analyte contained in liquid.

In a first aspect, an embodiment of the present application provides an apparatus for sensing an analyte contained in liquid, including: a liquid flow structure component, including: a measurement chamber configured to receive the analyte to be sensed, and wherein a sensible electrical signal is generated when the analyte to be sensed enters the measurement chamber along a first direction, an outlet chamber in fluid connection with the measurement chamber, and a nanochannel including a first opening connecting with the measurement chamber and a second opening connecting with the outlet chamber, so that the outlet chamber is in fluid connection with the measurement chamber, wherein a height difference between the first opening and the second opening of the nanochannel in the first direction is less than 20 µm; a sensing component coupled to the measurement chamber to sense the electrical signal.

In some embodiments, the length of the nanochannel is 3 nm to 1000 µm, and the cross-sectional area of the nanochannel is 2 nm² to 250,000 nm².

In some embodiments, the cross-sectional area of the nanochannel is 5 nm² to 50,000 nm².

In some embodiments, the cross-sectional area of the nanochannel is 5 nm² to 25,000 nm².

In some embodiments, the cross-sectional area of the nanochannel is 5 nm² to 11000 nm², and the height difference is less than 11 µm.

In some embodiments, the cross-sectional area of the nanochannel is 5 nm² to 50 nm², and the height difference is less than 500 nm.

In some embodiments, the cross-sectional area of the nanochannel is 5 nm² to 20 nm², and the height difference is less than 160 nm.

In some embodiments, an angle between the first direction and a second direction defined between the first opening and the second opening is from 45° to 105°.

In some embodiments, an angle between the first direction and a second direction defined between the first opening and the second opening is from 75° to 100°.

In some embodiments, the nanochannel extends along a horizontal direction.

In some embodiments, the horizontal direction is perpendicular to the first direction.

In some embodiments, the height difference between the first opening and the second opening is 0.

In some embodiments, a separator is disposed at the top of the measurement chamber, and the separator is provided with a nanopore connecting two sides of the separator, or the separator is to be provided with a nanopore connecting two sides of the separator, and wherein the electrical signal is generated when the analyte to be sensed passes through the nanopore.

In some embodiments, the liquid flow structure component further includes a sample chamber for receiving and maintaining the liquid containing the analyte to be sensed, and the separator is disposed between the sample chamber and the measurement chamber.

In some embodiments, the liquid flow structure component includes a substrate layer and a first chamber layer connected to one side of the substrate layer, the first chamber layer includes the sample chamber, the measurement chamber and the outlet chamber, and the sample chamber, the measurement chamber and the outlet chamber are disposed on the same side of the substrate layer.

In some embodiments, one of the substrate layer and the first chamber layer includes a first trench, and the other one of the substrate layer and the first chamber layer covers the first trench to form the nanochannel.

In some embodiments, the first chamber layer further includes a protruding part disposed on the substrate layer, and the protruding part is disposed within the outlet chamber; and wherein the nanochannel is disposed on the protruding part.

In some embodiments, the measurement chamber includes a first main body chamber connecting with the sample chamber, and a first connection chamber connecting the first main body chamber and the nanochannel, wherein a gap is disposed at one end of the first chamber layer near the substrate layer, and the substrate layer and walls of the gap define the first connection chamber.

In some embodiments, the liquid flow structure component includes a substrate layer as well as a second chamber layer and a third chamber layer disposed on opposite sides of the substrate layer, the sample chamber and the measurement chamber are disposed in the second chamber layer, and the outlet chamber includes a second connection chamber penetrating two sides of the substrate layer as well as a second main body chamber disposed in the third chamber layer; and wherein the measurement chamber, the nanochannel, the second connection chamber and the second main body chamber are sequentially connected.

In some embodiments, the sensing component includes: a first electrode disposed in the outlet chamber to apply, to the liquid in the outlet chamber, a voltage driving the analyte to be sensed to enter the measurement chamber; and a detection electrode disposed in the measurement chamber to sense the electrical signal generated when the analyte to be sensed enters the measurement chamber.

In some embodiments, the liquid flow structure component includes a plurality of measurement chambers, and one outlet chamber is in fluid connection with at least two measurement chambers through nanochannels.

In some embodiments, the one outlet chamber and the measurement chambers in connection with the outlet chamber constitute a measurement subunit, and a plurality of measurement subunits are arranged in an array.

In some embodiments, in one measurement subunit, the measurement chambers are disposed around the outlet chamber.

In a second aspect, an embodiment of the present application provides a device for characterizing a biopolymer, including: the apparatus for sensing the analyte contained in the liquid as described above; and a data processing module electrically connected to sensing components of the apparatus, wherein the data processing module is configured to generate characterization information of the biopolymer based on electrical signals collected by the sensing components.

In some embodiments, the data processing module includes: signal amplifier units electrically connected to the sensing components in one-to-one correspondence, wherein the signal amplifier units are configured to amplify analog voltage signals collected by the sensing components; a multiplexer unit electrically connected to the signal amplifier units; an analog-to-digital conversion unit electrically connected to the multiplexer unit, wherein the multiplexer unit is configured to control output terminals of the signal amplifier units to connect with the analog-to-digital conversion unit in sequence, and the analog-to-digital conversion unit is configured to convert the analog voltage signals output by the output terminals of the signal amplifier units into digital voltage signals.

BRIEF DESCRIPTION OF THE DRAWINGS

In order to illustrate technical solutions of embodiments of the present application more clearly, the drawings required for the embodiments of the present application will be briefly described. Obviously, the drawings described below are only some embodiments of the present application. For a person skilled in the art, other drawings can also be obtained from these drawings without any inventive effort.

REFERENCE NUMBERS 1, liquid flow structure component; 11, sample chamber; 12, measurement chamber; 121, first main body chamber; 122, first connection chamber; 13, outlet chamber; 131, second connection chamber; 132, second main body chamber; 14, nanochannel; 141, first opening; 142, second opening; 15, substrate layer; 151, protruding part; 16, first chamber layer; 161, spacer; 162, installation component; 17, second chamber layer; 18, third chamber layer; 3, sensing component; 31, detection electrode; 32, first electrode; 4, separator; 20, signal amplifier unit; 30, multiplexer unit; 40, analog-to-digital conversion unit.

DETAILED DESCRIPTION

The features and exemplary embodiments of various aspects of the present application will be described in detail below. In the detailed description below, many specific details are presented to provide a comprehensive understanding of the present application. It will be apparent to a person skilled in the art that the present application may be practiced without some of these specific details. The following description of the embodiments is merely to provide a better understanding of the present application by illustrating examples of the present application.

The orientation terms in the description of the present application are only to facilitate and simplify the description of the present application, and are not to indicate or imply that the device or element must have a specific orientation, or must be constructed and operated in a specific orientation. Therefore, the orientation terms cannot be understood as a limitation to the present application.

It should be noted that the embodiments in the present application as well as the features in the embodiments may be combined with each other without conflict. The embodiments will be described in detail below in combination with the accompanying drawings.

Figure 1:
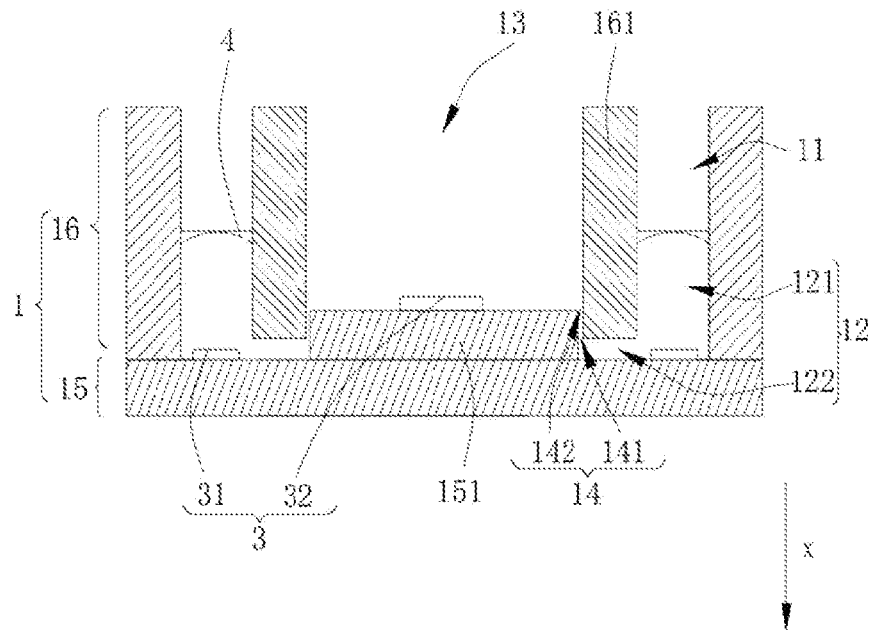
FIG. 1 is a schematic cross-sectional structure diagram of an apparatus provided by an embodiment of the present application.

In a first aspect, an embodiment of the present application provides an apparatus. As shown in FIG. 1, the apparatus includes a liquid flow structure component 1 and a sensing component 3. The liquid flow structure component 1 includes: a measurement chamber 12 configured to receive the analyte to be sensed, and wherein a sensible electrical signal is generated when the analyte to be sensed enters the measurement chamber 12 along a first direction; an outlet chamber 13 in fluid connection with the measurement chamber 12; and a nanochannel 14 including a first opening 141 connecting with the measurement chamber 12 and a second opening 142 connecting with the outlet chamber 13, so that the outlet chamber 13 is in fluid connection with the measurement chamber 12, wherein a height difference between the first opening 141 and the second opening 142 of the nanochannel 14 in the first direction is less than 20 μm. The sensing component 3 is coupled to the measurement chamber 12 to sense the electrical signal.

The apparatus in the present application may be configured to characterize biopolymers, for example, used for polynucleotide sequencing, polypeptide sequencing and the like. The biopolymers can specifically be polynucleotides, polypeptides, polysaccharides, or lipids, and the polynucleotides include DNA and/or RNA. The liquid flow structure component 1 may be made of a dielectric material, such as silicon dioxide. The liquid flow structure component 1 further includes a sample chamber 11 for receiving and maintaining the liquid containing the analyte to be sensed, and the measurement chamber 12 in fluid connection with the sample chamber 11. The measurement chamber 12 receives the liquid containing the analyte to be sensed from the sample chamber 11. The sensing component 3 may be connected to a power supply, a solvent can be placed in the measurement chamber 12 and the outlet chamber 13, and a molecular membrane with a transmembrane nanopore, or a nanopore solid material can be prepared in the sample chamber 11. For example, the sensing component 3 is energized to form a potential difference on two sides of the molecular membrane. The biopolymer located on a side of the molecular membrane passes through the transmembrane nanopore under the action of the potential difference, and the sensing component 3 collects the voltage change when the biopolymer passing through the transmembrane nanopore. The characterization information of the biopolymer can be obtained according to the analysis of the voltage change. For example, the size information, sequence information, identity information and modification information of the biopolymer may be obtained according to the voltage change information.

Figure 2:
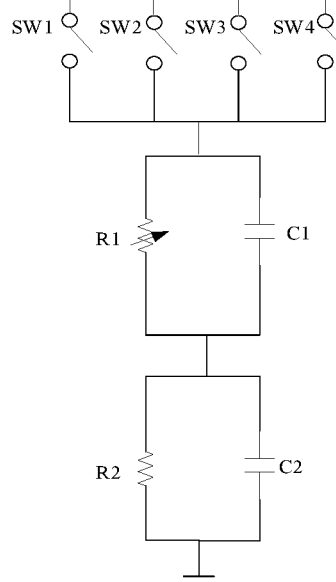
FIG. 2 is an equivalent circuit diagram of the apparatus shown FIG. 1 when used for characterizing a biopolymer.

The shortest distance between the measurement chamber 12 and the outlet chamber 13 connected by the nanochannel 14 is the length of the nanochannel 14, and the nanochannel 14 is a channel having the width and/or the height in the order of nanometer. It is understood by those skilled in the art that the liquid and the molecular membrane contained in the measurement chamber 12 can be equivalent to a first resistor having a resistance value changing with the movement of the analyte to be sensed. The liquid contained in the nanochannel 14 can be equivalent to a second resistor having a fixed resistance value, and the second resistor and the first resistor are in series. Please refer to FIG. 2, which is an equivalent circuit diagram of the apparatus of the present application. The working principle of the present application is explained in the example of FIG. 2. Here, the first switch SW 1, the second switch SW 2, the third switch SW 3 and the fourth switch SW 4 are connected with different bias voltages VBIAS1~VBIAS4 respectively. Under a condition that at least one switch is turned on, the first resistor R1 is equivalent to a variable resistor of the liquid and the nanopore in the measurement chamber 12, the capacitor C1 is equivalent to a parasitic capacitor formed by the liquid and the nanopore in the measurement chamber 12, and the second resistor R2 is equivalent to a resistor of the liquid contained in the nanochannel 14. The second resistor R2 may divide the voltage of the parallel circuit composed of the first resistor R1 and the parasitic capacitor C1, so that the sensing component 3 is configured to sample the electrical signal after the voltage is divided, and obtain the change of the electrical signal generated when the analyte to be sensed enters the measurement chamber 12 along the first direction. In particular, under a condition that the length of the nanochannel 14 is long enough or the aspect ratio is large enough, the parasitic capacitor C2 equivalent to the liquid contained in the nanochannel 14 is small, thereby reducing the effect of the parasitic capacitor C2 on the detection of the first resistor R1 by the sensing component 3.

It is understood by those skilled in the art that the apparatus usually includes a plurality of measurement chambers 12, so that the whole apparatus is a plate structure, and the apparatus can be prepared by a photolithography process. To facilitate the preparation of the apparatus, the apparatus can be prepared along the first direction X shown in FIG. 1, so as to avoid preparing the suspended structure. The height difference between the first opening 141 and the second opening 142 of the nanochannel 14 in the first direction is less than 20 μm, so that the nanochannel 14 can be prepared by planar nanostructure processing techniques, such as etching, pressing, and deposition shrinkage, and the complexity of the processing can be reduced.

According to the apparatus and the device for sensing the analyte contained in the liquid provided by the present application, by setting the nanochannel 14 to connect the measurement chamber 12 and the outlet chamber 13, the nanochannel 14 can be equivalent to an equivalent resistance coupled to the sensing component 3. Thus, the nanochannel 14 can divide the voltage of the measurement chamber 12, which improves the strength of the sensible electrical signal and improves the accuracy of interpretation. By setting the nanochannel 14 in a channel form, the parasitic capacitance formed by the nanochannel 14 can be effectively reduced, thereby increasing the signal bandwidth collected by the sensing component 3 and reducing the noise in the collected signal. Thus, the speed of measurement and the accuracy of interpretation can be effectively improved. The height difference between the first opening 141 and the second opening 142 of the nanochannel 14 in the first direction is less than 20 μm, so that the nanochannels 14 are easy to be manufactured, and it is possible to prepare complex nanochannel structures. Further, the prepared device has good structural stability and high consistency. By setting the outlet chamber 13 in fluid connection with the measurement chamber 12, the liquid in the outlet chamber 13 can be used to adjust the liquid concentration in the measurement chamber 12. Further, when the measurement chamber 12 receives the liquid containing the analyte to be sensed from the sample chamber 11, the fluctuation range of the electrolyte ion concentration in the measurement chamber 12 can be reduced. Thus, the fluctuation range of the noise in the electrical signal collected by the sensing component 3 is reduced, and the accuracy of interpretation is effectively improved.

In an example, the length of the nanochannel 14 is 3 nm to 1,000 μm, and the cross-sectional area of the nanochannel 14 is 2 nm$^2$ to 250,000 nm$^2$, preferably 5 nm$^2$ to 50,000 nm$^2$, and more preferably 5 nm$^2$ to 25,000 nm$^2$. Those skilled in the art may specifically set the dimension of the nanochannel according to actual needs (e.g., according to the conductivity, the concentration and the like of the contained liquid in the measurement chamber). In another example, the cross-sectional area of the nanochannel 14 is 5 nm$^2$ to 11000 nm$^2$, and the height difference is less than 11 μm. In another example, the cross-sectional area of the nanochannel 14 is from 5 nm$^2$ to 50 nm$^2$, and the height difference is less than 500 nm. In another example, the cross-sectional area of the nanochannel 14 is 5 nm$^2$ to 20 nm$^2$, and the height difference is less than 160 nm. It is understood by those skilled in the art that the nanochannels 14 may be configured with different aspect ratios, which are equivalent to different resistance values, and thus the nanochannels 14 can fit different measurement chambers 12.

In an example, the angle between the first direction and a second direction defined between the first opening 141 and the second opening 142 is from 45° to 105°, preferably from 75° to 100°. The second direction may be a direction defined by the connecting line between the geometric center of the first opening 141 and the geometric center of the second opening 142. For example, the first direction is a vertical direction, when the angle of the first direction and the second direction is 90°, the nanochannel 14 extends a horizontal direction, and the height difference between the first opening 141 and the second opening 142 can be 0. That is, the second direction is the horizontal direction, and the horizontal direction is perpendicular to the first direction. When the angle of the first direction and the second direction is 105°, the first opening 141 is higher the second opening 142; and when the angle of the first direction and the second direction is 45°, the first opening 141 is lower than the second opening 142. The angle of the first direction and the second direction is controlled so that the extension direction of the nanochannel 14 is more gentle relative to the first direction. Therefore, the preparation of the nanochannel 14 is easy, and the quality of the prepared device is stable.

Figure 3:
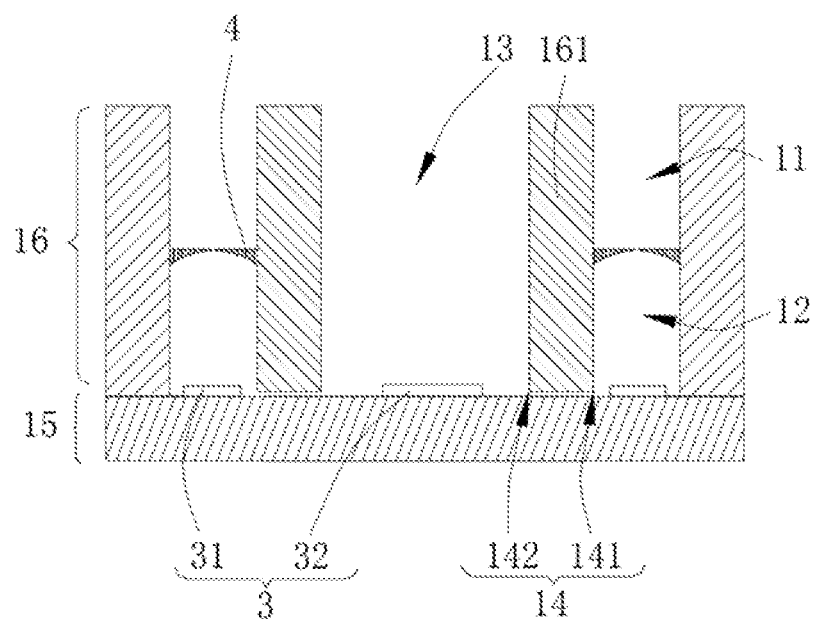
FIG. 3 is a schematic cross-sectional structure diagram of an apparatus provided by another embodiment of the present application.

As shown in FIG. 3, in an embodiment, the liquid flow structure component 1 includes a substrate layer 15 and a first chamber layer 16 connected to one side of the substrate layer 15, the first chamber layer 16 includes the sample chamber 11, the measurement chamber 12 and the outlet chamber 13, and the sample chamber 11, the measurement chamber 12 and the outlet chamber 13 are disposed on the same side of the substrate layer 15. It is understood by those skilled in the art that the substrate layer 15 and the first chamber layer 16 may be prepared from a same material, or from different dielectric materials. The structures of the substrate layer 15 and the first chamber layer 16 can be prepared simultaneously, and then can be combined together to form the apparatus. Also, the structures of the substrate layer 15 and the first chamber layer 16 can be prepared in sequence, and the substrate layer 15 and the first chamber layer 16 may also be an integral component.

Since the measurement chamber 12 and the outlet chamber 13 are located in the first chamber layer 16, and the measurement chamber 12 and the outlet chamber 13 are disposed on the same side of the substrate layer 15, the nanochannel 14 extends only in the horizontal direction to connect the measurement chamber 12 and the outlet chamber 13. The nanochannel 14 has a top surface and a bottom surface disposed oppositely in the vertical direction. Under a condition that the nanochannel 14 extends in the horizontal direction, the bottom surface of the nanochannel 14 is in a same plane, and the top surface of the nanochannel 14 is in a same plane. Compared with the nanochannel 14 extending along the vertical direction, the nanochannel 14 extending along the horizontal direction is easy to be prepared.

For example, one of the substrate layer 15 and the first chamber layer 16 includes a first trench, and the other one of the substrate layer 15 and the first chamber layer 16 covers the first trench to form the nanochannel 14. The first trench extends in the horizontal direction. For example, in the embodiment shown in FIG. 4, the first trench is arranged on the first chamber layer 16, and the substrate layer 15 and the first chamber layer 16 surround to form the nanochannel 14. Specifically, the substrate layer 15 and the first chamber layer 16 having the first trench can be prepared respectively, and then the first chamber layer 16 and the substrate layer 15 can be combined to form the nanochannel 14. Of course, the substrate layer 15 can be prepared first, and the first chamber layer 16 having a chamber and the nanochannel 14 can be formed by etching a layer above the substrate layer 15. The preparation methods are various and will not be described here.

Figure 4:
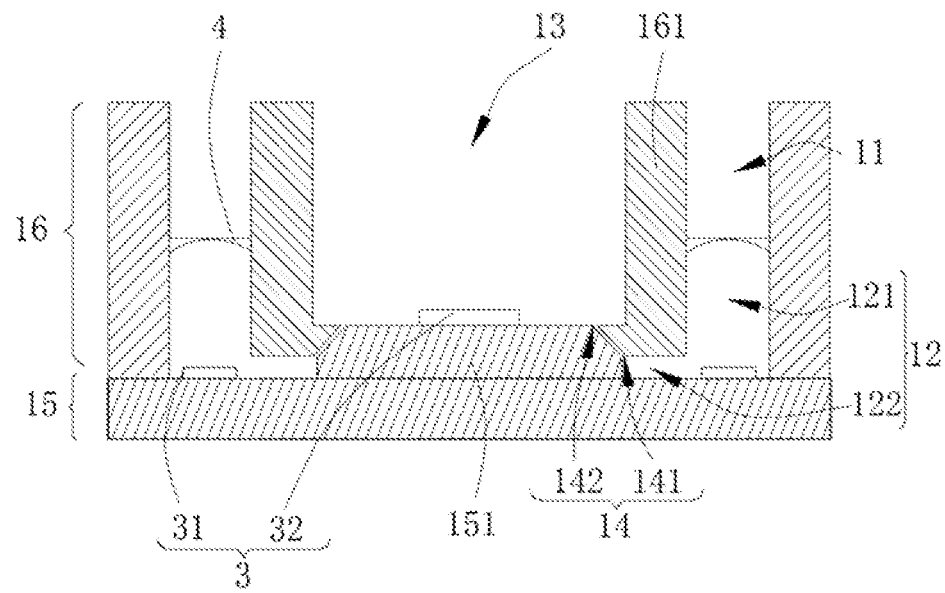
FIG. 4 is a schematic cross-sectional structure diagram of an apparatus provided by another embodiment of the present application.

Referring to FIGS. 1 and 4, in an embodiment, the first chamber layer 16 further includes a protruding part disposed on the substrate layer 15, and the protruding part 151 is disposed within the outlet chamber 13; and wherein the nanochannel 14 is disposed on the protruding part 151. In the embodiment shown in FIG. 1, the nanochannel 14 is arranged on the protruding part 151 in the vertical direction. A spacer 161 of the measurement chamber 12 and the outlet chamber 13 forms the nanochannel 14 with the protruding part 151. In the embodiment shown in FIG. 3, the extension direction of the nanochannel 14 has an angle with the vertical direction, and the nanochannel 14 is obliquely disposed on the protruding part 151. The structure of the nanochannel 14 may be set according to specific needs, which is not limited in the present application. Specifically, the nanochannel 14 may be set along the horizontal direction, may be set along the vertical direction, may be bend as step like, and may be set as curved.

Further, the measurement chamber 12 includes a first main body chamber 121 connecting with the sample chamber 11, and a first connection chamber 122 connecting the first main body chamber 121 and the nanochannel 14. A gap is disposed at one end of the first chamber layer 16 near the substrate layer 15, and the substrate layer 15 and walls of the gap define the first connection chamber 122. The first connection chamber 122 may be non-nanosized, and the size of the first connection chamber 122 may be much larger than the size of the nanochannel 14. Further, the first connection chamber 122 may also be nano-sized, so that the liquid contained in the first connection chamber 122 can also be equivalent to a large resistor used for dividing the voltage. Regardless of the size and the shape of the first connection chamber 122 as well as the forming method thereof, it is only necessary to ensure that the first connection chamber 122 connects the measurement chamber 12 and the nanochannel 14.

Figure 5:
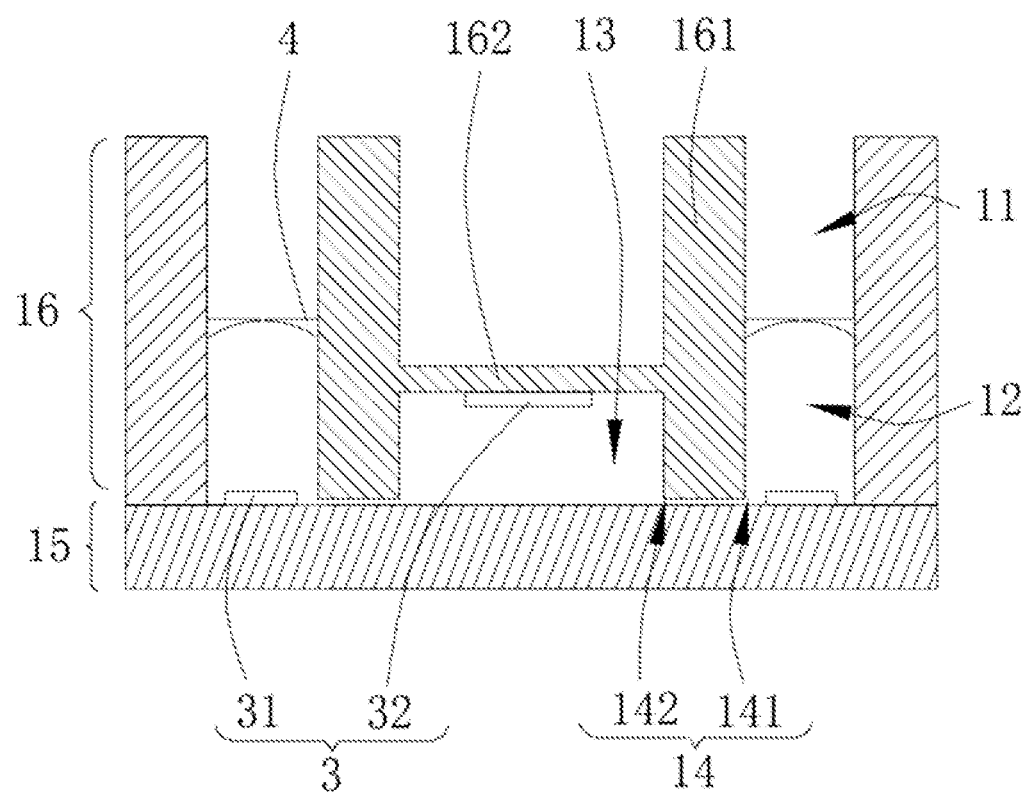
FIG. 5 is a schematic cross-sectional structure diagram of an apparatus provided by another embodiment of the present application.

The specific structure of the outlet chamber 13 is not limited in the present application. Specifically, in the embodiments shown in FIGS. 1, 3 and 4, the outlet chamber 13 and the measurement chamber 12 are separated by the spacer 161, and no shielding structure is disposed on the outlet chamber 13. Referring to FIG. 5, in an embodiment, the first chamber layer 16 also includes an installation component 162 disposed opposite to the substrate layer 15, and the edge of the installation component 162 is connected to the spacer 161. The installation component 162, the spacer 161 and the substrate layer 15 surround to form the outlet chamber 13. The sensing component 3 includes: a first electrode 32 disposed in the outlet chamber 13 to apply, to the liquid in the outlet chamber 13, a voltage driving the analyte to be sensed to enter the measurement chamber 12; and a detection electrode 31 disposed in the measurement chamber 12 to sense the electrical signal generated when the analyte to be sensed enters the measurement chamber 12. The specific location of the first electrode 32 in the outlet chamber 13 is not limited in the present application. In an embodiment, the first electrode 32 is disposed on the substrate layer 15. In another embodiment, the first electrode 32 is disposed on the spacer 161. In another embodiment, the first electrode 32 is disposed on the installation component 162. Those skilled in the art may determine the position of the first electrode 32 according to the specific structure of the outlet chamber 13 and the specific measurement needs, and may determine the relative position of the outlet chamber 13 and the measurement chamber 12 according to the specific measurement needs.

In an embodiment, the apparatus further includes a separator 4 disposed on the top of the measurement chamber 12, and the separator 4 is provided with a nanopore connecting two sides of the separator 4, or the separator 4 is configured to provide a nanopore connecting two sides of the separator 4, and wherein the electrical signal is generated when the analyte to be sensed passes through the nanopore. The separator 4 can be a molecular membrane composed of phospholipid bimolecular and grease, and can also be a solid layer structure, which is provided with a nanopore. Specifically, the separator 4 is disposed between the sample chamber 11 and the measurement chamber 12. The separator 4 being a molecular membrane having a membrane structure prepared by an amphiphilic material is taken as an example below. The measurement chamber 12 may contain a polar solvent, such as a buffer liquid for the preparation of the molecular membrane, for example, a phosphate buffer liquid, a HEPES buffer liquid containing KCl or NaCl, a CAPS buffer liquid containing KCl or NaCl, and the like. The liquid level height of the polar solvent in the measurement chamber 12 may be controlled, so that the newly added nonpolar solvent can be distributed on the surface of the polar solvent and can form a liquid membrane on the surface of the polar solvent. The nonpolar solvent can be a nonpolar solvent that is able to dissolve the amphiphilic material. For example, the nonpolar solvent may be silicone oil, and in particular may be methyl phenyl silicone oil, polydimethyl siloxane and the like. The nonpolar solvent can drive away the polar solvent, which completes the "oil driving water" process. On this basis, the polar solvent is added to drive away the nonpolar solvent of the amphiphilic material, which completes the "water driving oil" process. The polar solvent, such as a buffer liquid, may specifically be a phosphate buffer liquid, a HEPES buffer liquid containing KCl or NaCl, a CAPS buffer liquid containing KCl or NaCl, and the like. At this time, a structure of the polar solvent to the nonpolar solvent to the polar solvent can be formed in the sample chamber 11, and the nonpolar solvent of the amphiphilic material is sandwiched between two layers of the polar solvents to form an amphiphilic molecular membrane, which is suspended in the sample chamber 11. The specific shapes of the sample chamber 11 and the measurement chamber 12 is not limited, it is only necessary to ensure that the sample chamber 11 can contain the polar solvents and the nonpolar solvent, and the molecular membrane can be formed in the sample chamber 11. The sample chamber 11 is provided with an injection port for flowing the liquid, and the size and the shape of the injection port are not limited, as long as the polar solvent or the nonpolar solvent and the liquid can be added into the measurement chamber 12.

In order to form a potential difference on two sides of the separator 4, the apparatus provided by the present application may also include a second electrode cooperating with the first electrode 32. The second electrode may be controlled by a plurality of switches to output different voltages or currents, so as to control the direction and speed of the biopolymer passing through the transmembrane nanopore. Of course, the apparatus provided by the present application may also not include the second electrode, and may use an external power supply as the second electrode cooperating with the first electrode 32.

Further, the volume of the measurement chamber 12 is smaller than the volume of the outlet chamber 13, so that more liquid can be placed in the outlet chamber 13 to maintain the liquid concentration in the measurement chamber 12, and the fluctuation range of the electrolyte ion concentration in the measurement chamber 12 may be reduced.

Further, the first electrode 32 is disposed on the substrate layer 15 and contained inside the outlet chamber 13. For example, the first electrode 32 is disposed on the substrate layer 15 to facilitate the wiring of the circuit connected to the first electrode 32. Further, the detection electrode 31 may also be disposed on the substrate layer 15 to facilitate the wiring.

Figure 6:
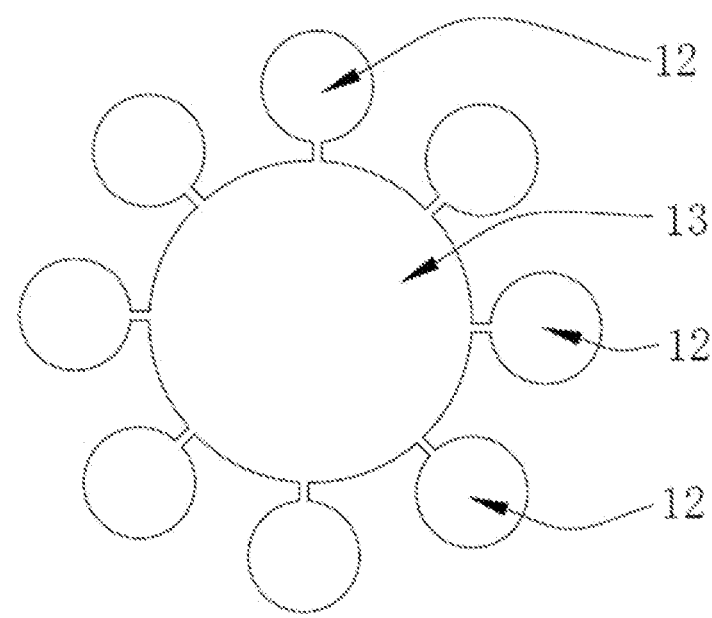
FIG. 6 is a schematic top view of a structure of a measurement subunit provided by an embodiment of the present application.
Figure 7:
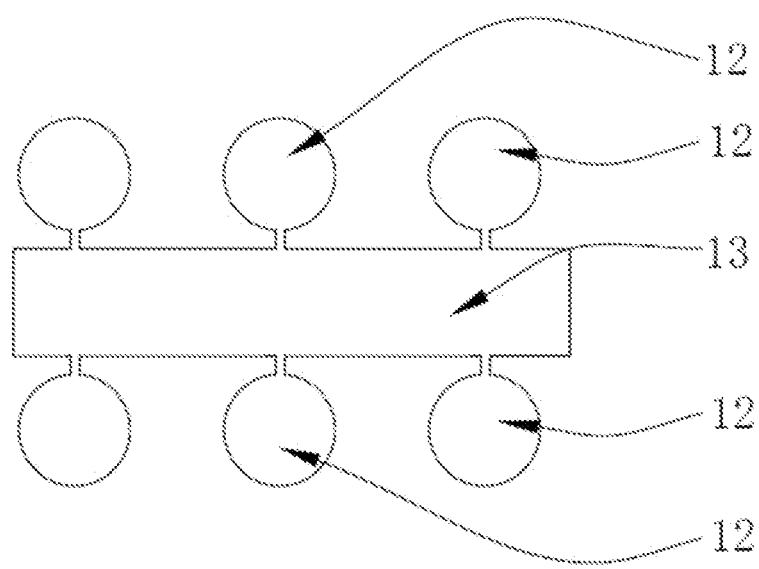
FIG. 7 is a schematic top view of a structure of a measurement subunit provided by another embodiment of the present application.

Refer to FIGS. 6 and 7, the liquid flow structure component 1 includes a plurality of measurement chambers 12 and a plurality of outlet chamber 13, and one outlet chamber 13 is connected with at least two measurement chambers 12 through the nanochannels 14. That is, the measurement chambers 12 share one outlet cavity 13, which eliminates the preparation of the plurality of outlet cavity 13. Therefore, the preparation is simplified and the structural compactness of the apparatus is improved.

In the apparatus, the one outlet chamber 13 and the measurement chambers 12 in connection with the outlet chamber 13 constitute a measurement subunit, and a plurality of measurement subunits are arranged in an array. Therefore, each measurement chamber 12 can start the measurement task, which increases the measurement rate of the apparatus.

In the apparatus, there may be a plurality of sample chambers 11 and a plurality of measurement chambers 12, the sample chambers 11 and the measurement chambers 12 are in one-to-one correspondence, and the measurement chambers 12 are distributed in one or more columns. In this way, a plurality of separators 4 can be simultaneously disposed in one apparatus to provide the characterization of multiple biopolymers, which improves the efficiency of the detection work. It is understood that one sample chamber 11 may be provided to correspond to one measurement chamber 12, and a plurality of sample chambers 11 may be provided to correspond to a plurality of measurement chambers 12, which is not limited here, and can be selected according to specific requirements. When a plurality of measurement chambers 12 and a corresponding plurality of sample chambers 11 are disposed on one apparatus, the plurality of sample chambers 11 may be arranged regularly or not arranged regularly, which is not limited here.

Optionally, in an embodiment, the adjacent measurement chambers 12 are separated from each other. That is, the measurement chambers 12 are not directly connected, so that the independence of the sequencing work of the measurement chamber 12 and the corresponding sample chamber 11 is guaranteed, and interference may be avoided.

In some embodiments, the plurality of measurement chambers 12 are distributed in multiple columns on the substrate layer 15, and two adjacent columns of the measurement chambers 12 are distributed alternatively. It is understood that each measurement chamber 12 is provided with a corresponding detection electrode 31, and a potential difference is formed on two sides of the separator 4 by connecting the detection electrode 31 to an external circuit of the apparatus. By distributing the plurality of measurement chambers 12 in multiple columns on the substrate layer 15, and distributing two adjacent columns of the measurement chambers 12 alternatively, the corresponding detection electrodes 31 at the bottom of the two adjacent columns of the measurement chambers 12 are distributed alternatively on the substrate layer 15. Therefore, the arrangement of the corresponding detection electrode 31 of the apparatus is more reasonable, which further improves the structural compactness of the device for characterizing the biopolymer.

It is understood that twos of the multiple columns of the outlet chambers 13 can correspond to a same circuit, and the first electrodes 32 corresponding to two adjacent columns of the outlet chambers 13 are connected to the same circuit. The first electrodes 32 corresponding to two adjacent columns of the outlet chambers 13 may extend in opposite directions. At this time, regardless of how the first electrodes 32 corresponding to two adjacent columns of the outlet chambers 13 arranges, the first electrodes 32 may not interfere each other. Therefore, the outlet chambers 13 corresponding to the first electrodes 33 extending in the opposite directions may not be distributed alternatively.

Further, in one measurement subunit, the measurement chambers 12 are disposed around the outlet chamber 13. In the embodiment shown in FIG. 6, the projection of the outlet chamber 13 on the substrate layer 15 is a ring, and the projection of the measurement chambers 12 on the substrate layer 15 is a plurality of rings surrounding the ring. As shown in FIG. 7, the projection of the outlet chamber 13 on the substrate layer 15 is a rectangle, and the projection of the measurement chambers 12 on the substrate layer 15 is a plurality of rings surrounding the rectangle. The shape of the outlet chamber 13 is not limited in the present application, those skilled in the art can arrange the measurement chambers 12 to surround the outlet chamber 13 according to an appropriate arrangement, so as to improve the compactness of the measurement subunits and ensure that the distances between the transmembrane nanopores and the outlet chamber 13 are short, thereby further reducing the fluctuation range of the electrolyte ion concentration during the measurement process.

In a second aspect, an embodiment of the present application provides a device for characterizing a biopolymer, including: the apparatus as described above; and a data processing module (not shown) electrically connected to detection electrodes 31, wherein the data processing module is configured to generate characterization information of the biopolymer based on electrical signals collected by the detection electrodes 31.

The device for characterizing the biopolymer provided by the embodiment of the present application has the same technical effect because it adopts the apparatus provided by any of the above embodiments or the biochip provided by any of the above embodiments, which is not repeated here.

Figure 8:
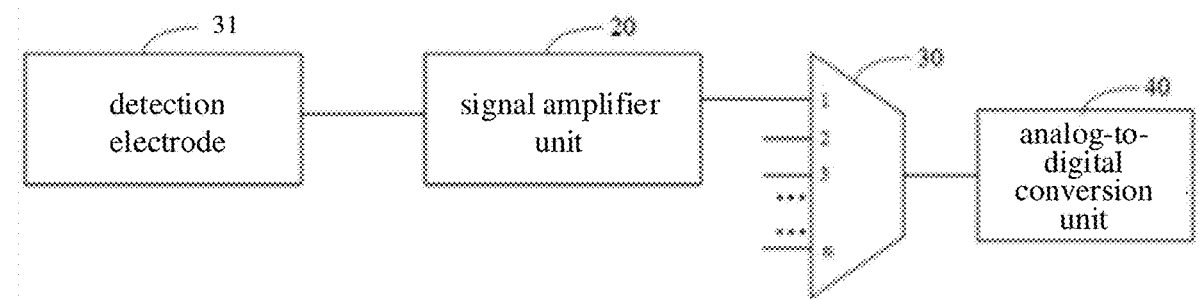
FIG. 8 is a schematic structure diagram of modules of a device for characterizing a biopolymer provided by an embodiment of the present application.

Referring to FIG. 8, the data processing module includes a plurality of signal amplifier units 20 electrically connected to the detection electrodes 31 in one-to-one correspondence; a multiplexer unit 30 electrically connected to the signal amplifier units 20; and an analog-to-digital conversion unit electrically connected to the multiplexer unit 30, wherein the signal amplifier units 20 are configured to amplify analog voltage signals collected by the detection electrodes 31, wherein the multiplexer unit 30 is configured to control output terminals of the signal amplifier units 20 to connect with the analog-to-digital conversion unit 40 in sequence, and the analog-to-digital conversion unit 40 is configured to convert the analog voltage signals output by the output terminals of the signal amplifier units into digital voltage signals.

Figure 9:
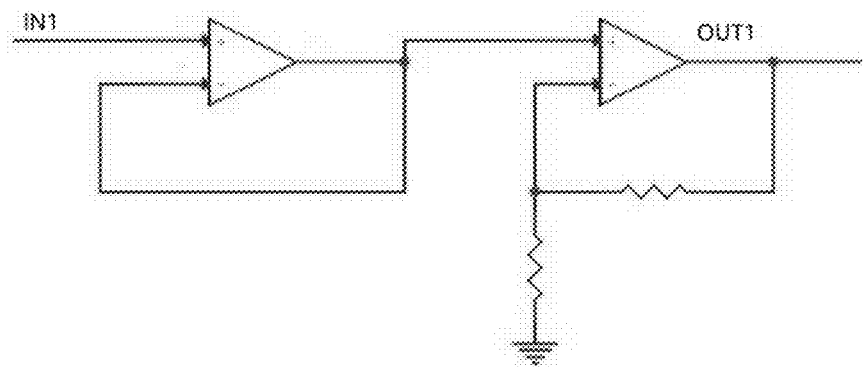
FIG. 9 is a schematic circuit diagram of a signal amplifier unit provided by an embodiment of the present application.
Figure 10:
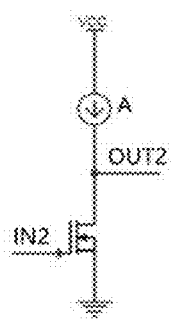
FIG. 10 is a schematic circuit diagram of a signal amplifier unit provided by another embodiment of the present application.

The signal amplifier unit 20 may adopt various circuit configurations. With reference to FIG. 9, the input terminal IN 1 of the signal amplifier unit 20 is electrically connected to the detection electrode 31, the output terminal OUT 1 of the signal amplifier unit 20 is electrically connected to the multiplexer unit 30. With reference to FIG. 10, a current source A and a metal-oxide-semiconductor field effect transistor (MOSFET) are disposed, the input terminal IN2 of the signal amplifier unit 20 is electrically connected to the detection electrode 31, and the output terminal OUT2 of the signal amplifier unit 20 is electrically connected to the multiplexer unit 30. Of course, the signal amplifier unit 20 can also be an operational transconductance amplifier circuit (OTA-C) or a cascade amplifier circuit (Cascode).

Figure 11:
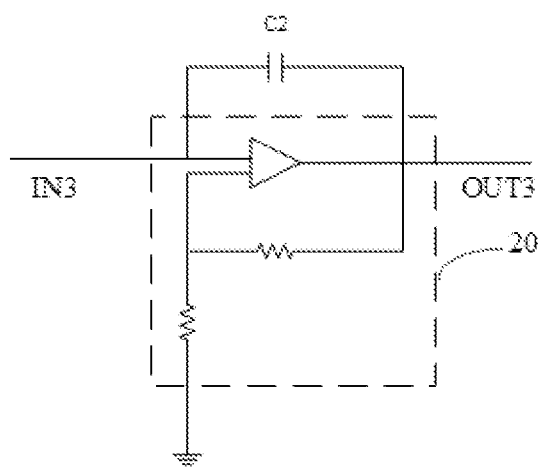
FIG. 11 is a schematic circuit diagram of a signal amplifier unit and a negative capacitance compensation unit provided by an embodiment of the present application.

Further, as shown in FIG. 11, in the data processing module, a negative capacitance compensation unit may be provided. The negative capacitance compensation unit includes a first compensation capacitor C2, and two terminals of the first compensation capacitor C2 are connected to the input terminal IN3 and the output terminal OUT 3 of the signal amplifier unit respectively. Thus, while the signal amplification unit buffers and amplifies the voltage signal, the negative capacitance compensation is also performed, thereby effectively increasing the bandwidth of the measured signal.

In addition, the term "and/or" in the present application is only an association relationship describing the associated objects, indicating that there are three relationships, for example, A and/or B can indicate that: A alone, A and B together, and B alone. In addition, the character "I" in the present application generally indicates that the associated objects are in a "or" relationship.

It should be understood that in the embodiments of the present application, "B corresponding to A" means that B is associated with A, and B may be determined according to A. However, it should be understood that determining B according to A does not mean determining B only according to A, but B may be determined according to A and/or other information.

The above embodiments are only the specific embodiments of the present application. However, the protection scope of the present application is not limited by the specific embodiments. Those skilled in the art can easily think of various equivalent modifications or replacements without departing from the technical scope of the present application, and the modifications or replacements shall be covered within the protection scope of the present application. Therefore, the protection scope of the present application shall be subject to the protection scope of the claim.

What is claimed is:

1. An apparatus for sensing an analyte contained in liquid, comprising:
    a liquid flow structure component, comprising:
    a measurement chamber configured to receive the analyte to be sensed, and wherein a sensible electrical signal is generated when the analyte to be sensed enters the measurement chamber along a first direction, wherein a separator is disposed at the top of the measurement chamber, and the separator is provided with a nanopore connecting two sides of the separator, and wherein the electrical signal is generated when the analyte to be sensed passes through the nanopore;
    an outlet chamber in fluid connection with the measurement chamber, and
    a nanochannel comprising a first opening connecting with the measurement chamber and a second opening connecting with the outlet chamber, so that the outlet chamber is in fluid connection with the measurement chamber;

a sensing component coupled to the measurement chamber to sense the electrical signal, wherein the sensing component comprises:
a detection electrode disposed in the measurement chamber to sense the electrical signal generated when the analyte to be sensed enters the measurement chamber,
wherein the liquid flow structure component comprises a substrate layer and a first chamber layer connected to one side of the substrate layer, the first chamber layer comprises the measurement chamber and the outlet chamber, and the measurement chamber and the outlet chamber are disposed on the same side of the substrate layer, wherein one of the substrate layer and the first chamber layer comprises a first trench, and the other one of the substrate layer and the first chamber layer covers the first trench to form the nanochannel.

2. The apparatus according to claim 1, wherein the length of the nanochannel is 3 nm to 1000 μm, and the cross-sectional area of the nanochannel is 2 nm$^2$ to 250,000 nm$^2$.

3. The apparatus according to claim 2, wherein the cross-sectional area of the nanochannel is 5 nm$^2$ to 11000 nm$^2$, and a height difference between the first opening and the second opening of the nanochannel in the first direction is less than 11 μm.

4. The apparatus according to claim 1, wherein an angle between the first direction and a second direction defined between the first opening and the second opening is from 45° to 105°.

5. The apparatus according to claim 1, wherein an angle between the first direction and a second direction defined between the first opening and the second opening is from 75° to 100°.

6. The apparatus according to claim 1, wherein the nanochannel extends along a horizontal direction.

7. The apparatus according to claim 6, wherein the horizontal direction is perpendicular to the first direction.

8. The apparatus according to claim 6, wherein a height difference between the first opening and the second opening is 0.

9. The apparatus according to claim 1, wherein the liquid flow structure component further comprises a sample chamber for receiving and maintaining the liquid containing the analyte to be sensed, and the separator is disposed between the sample chamber and the measurement chamber.

10. The apparatus according to claim 9, wherein the first chamber layer further comprises the sample chamber, and the sample chamber, the measurement chamber, and the outlet chamber are disposed on the same side of the substrate layer.

11. The apparatus according to claim 1, wherein the sensing component comprises:
a first electrode disposed in the outlet chamber to apply, to the liquid in the outlet chamber, a voltage driving the analyte to be sensed to enter the measurement chamber.

12. The apparatus according to claim 1, wherein the liquid flow structure component comprises a plurality of measurement chambers, and one outlet chamber is in fluid connection with at least two measurement chambers through nanochannels.

13. The apparatus according to claim 12, wherein the one outlet chamber and the measurement chambers in connection with the outlet chamber constitute a measurement subunit, and a plurality of measurement subunits are arranged in an array.

14. The apparatus according to claim 13, wherein in one measurement subunit, the measurement chambers are disposed around the outlet chamber.

15. An apparatus for sensing an analyte contained in liquid, comprising:
a liquid flow structure component, comprising:
a measurement chamber configured to receive the analyte to be sensed, and wherein a sensible electrical signal is generated when the analyte to be sensed enters the measurement chamber along a first direction, wherein a separator is disposed at the top of the measurement chamber, and the separator is provided with a nanopore connecting two sides of the separator, and wherein the electrical signal is generated when the analyte to be sensed passes through the nanopore;
an outlet chamber in fluid connection with the measurement chamber, and
a nanochannel comprising a first opening connecting with the measurement chamber and a second opening connecting with the outlet chamber, so that the outlet chamber is in fluid connection with the measurement chamber;
a sensing component coupled to the measurement chamber to sense the electrical signal, wherein the sensing component comprises:
a detection electrode disposed in the measurement chamber to sense the electrical signal generated when the analyte to be sensed enters the measurement chamber,
wherein the liquid flow structure component comprises a substrate layer and a first chamber layer connected to one side of the substrate layer, the first chamber layer comprises the measurement chamber and the outlet chamber, and the measurement chamber and the outlet chamber are disposed on the same side of the substrate layer,
wherein the first chamber layer further comprises a protruding part disposed on the substrate layer, and the protruding part is disposed within the outlet chamber; and wherein the nanochannel is disposed on the protruding part.

16. The apparatus according to claim 15, wherein the measurement chamber comprises a first connection chamber connecting a first main body chamber and the nanochannel, wherein a gap is disposed at one end of the first chamber layer near the substrate layer, and the substrate layer and walls of the gap define the first connection chamber.

17. A device for characterizing a biopolymer, comprising:
the apparatus for sensing the analyte contained in the liquid according to claim 1; and
a data processing module electrically connected to sensing components of the apparatus, wherein the data processing module is configured to generate characterization information of the biopolymer based on electrical signals collected by the sensing components.

18. The device according to claim 17, wherein the data processing module comprises:
signal amplifier units electrically connected to the sensing components in one-to-one correspondence, wherein the signal amplifier units are configured to amplify analog voltage signals collected by the sensing components;
a multiplexer unit electrically connected to the signal amplifier units;
an analog-to-digital conversion unit electrically connected to the multiplexer unit, wherein the multiplexer unit is configured to control output terminals of the signal amplifier units to connect with the analog-to-digital conversion unit in sequence, and the analog-to-digital conversion unit is configured to convert the analog voltage signals output by the output terminals of the signal amplifier units into digital voltage signals.

19. The apparatus according to claim 1, wherein a height difference between the first opening and the second opening of the nanochannel in the first direction is less than 20 μm.

* * * * *